US009917876B2

(12) United States Patent
Zhao et al.

(10) Patent No.: US 9,917,876 B2
(45) Date of Patent: Mar. 13, 2018

(54) VIDEO INFORMATION PLAYING SYSTEM AND METHOD

(71) Applicant: BOE Technology Group Co., Ltd., Beijing (CN)

(72) Inventors: Xingxing Zhao, Beijing (CN); Weixu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 318 days.

(21) Appl. No.: 14/771,537

(22) PCT Filed: Sep. 26, 2014

(86) PCT No.: PCT/CN2014/087530
§ 371 (c)(1),
(2) Date: Aug. 31, 2015

(87) PCT Pub. No.: WO2016/000332
PCT Pub. Date: Jan. 7, 2016

(65) Prior Publication Data
US 2016/0366204 A1    Dec. 15, 2016

(30) Foreign Application Priority Data

Jun. 30, 2014   (CN) .......................... 2014 1 0306837

(51) Int. Cl.
*G06F 15/16* (2006.01)
*H04L 29/06* (2006.01)
(Continued)

(52) U.S. Cl.
CPC .......... *H04L 65/604* (2013.01); *G06F 3/0482* (2013.01); *G06F 3/0488* (2013.01);
(Continued)

(58) Field of Classification Search
USPC .............. 709/217, 223; 386/239; 375/240.26
See application file for complete search history.

(56) References Cited

U.S. PATENT DOCUMENTS

2003/0007566 A1* 1/2003 Peng ................ H04N 21/25808
                                                    375/240.25
2005/0012861 A1* 1/2005 Hentschel ............. G06F 9/5011
                                                    348/553
(Continued)

FOREIGN PATENT DOCUMENTS

CN    101202568 A    6/2008
CN    101577110 A    11/2009
(Continued)

OTHER PUBLICATIONS

First Office Action, including Search Report, for Chinese Patent Application No. 201410306837.9, dated Nov. 4, 2016, 12 pages.
(Continued)

*Primary Examiner* — Tammy Nguyen
(74) *Attorney, Agent, or Firm* — Westman, Champlin & Koehler, P.A.

(57) ABSTRACT

The embodiments of the present disclosure provide a video information play system and method. The video information play system comprises: a video file separator; an information processing unit; a system resource monitoring module configured to obtain hardware parameters and resource consumption of the video information play system; a decoding parameter setting unit configured to set decoding parameters corresponding to the video information to be played according to the video information parameters from the video file separator; and an adaptation unit configured to obtain the video information play parameters of the video information to be played according to the video information parameters, configure parameters of the information processing unit according to the obtained hardware parameters and resource
(Continued)

consumption of the video information play system, the decoding parameters and the video information play parameters, and configure parameters of the video file separator according to the video information play parameters.

11 Claims, 7 Drawing Sheets

(51) Int. Cl.

| | | |
|---|---|---|
| H04N 21/4402 | (2011.01) | |
| H04N 21/442 | (2011.01) | |
| H04N 21/462 | (2011.01) | |
| G06F 3/0488 | (2013.01) | |
| G06F 3/14 | (2006.01) | |
| G06F 3/0482 | (2013.01) | |
| G06K 9/00 | (2006.01) | |
| G09G 5/12 | (2006.01) | |
| H04L 12/24 | (2006.01) | |
| H04N 7/088 | (2006.01) | |
| H04N 21/41 | (2011.01) | |
| H04N 21/436 | (2011.01) | |
| H04N 21/4363 | (2011.01) | |
| H04N 21/488 | (2011.01) | |
| G06F 3/0484 | (2013.01) | |
| H04N 5/445 | (2011.01) | |

(52) U.S. Cl.
CPC ............ *G06F 3/04847* (2013.01); *G06F 3/14* (2013.01); *G06K 9/00671* (2013.01); *G09G 5/12* (2013.01); *H04L 41/22* (2013.01); *H04L 65/80* (2013.01); *H04N 5/445* (2013.01); *H04N 5/44504* (2013.01); *H04N 7/0885* (2013.01); *H04N 21/4126* (2013.01); *H04N 21/4131* (2013.01); *H04N 21/43615* (2013.01); *H04N 21/43635* (2013.01); *H04N 21/4402* (2013.01); *H04N 21/4424* (2013.01); *H04N 21/4621* (2013.01); *H04N 21/4884* (2013.01); *G09G 2340/10* (2013.01); *G09G 2340/125* (2013.01); *G09G 2370/12* (2013.01); *H04N 2005/44526* (2013.01); *H04N 2005/44534* (2013.01)

(56) References Cited

U.S. PATENT DOCUMENTS

| | | | |
|---|---|---|---|
| 2006/0002255 A1 | 1/2006 | Weng et al. | |
| 2010/0046637 A1* | 2/2010 | Raveendran | H04N 21/4348 375/240.26 |
| 2011/0249954 A1* | 10/2011 | Meek | H04N 5/772 386/239 |
| 2012/0185610 A1 | 7/2012 | Chen | |
| 2016/0366204 A1* | 12/2016 | Zhao | H04N 21/4402 |

FOREIGN PATENT DOCUMENTS

| | | |
|---|---|---|
| CN | 102055966 A | 5/2011 |
| CN | 102316319 A | 1/2012 |
| CN | 102904857 A | 1/2013 |

OTHER PUBLICATIONS

Extended European search report for European Patent Application No. 14882789.2, dated Oct. 25, 2016, 8 pages.
International Search Report and Written Opinion for PCT Application No. PCT/CN2014/087530, dated Apr. 1, 2015, 8 pages.
English translation of Box No. V from the Written Opinion for the International Searching Authority for PCT Application No. PCT/CN2014/087530, 2 pages.
Communication pursuant to Article 94(3) EPC from European Application No. 14 882 789.2, dated Aug. 3, 2017, 5 pages.

* cited by examiner

VIDEO INFORMATION PLAYING SYSTEM AND METHOD

CROSS-REFERENCE TO RELATED APPLICATIONS

This application is a Section 371 National Stage Application of International Application No. PCT/CN2014/087530, filed 26 Sep. 2014, which claims the benefit of Chinese patent Application No. 201410306837.9 filed on Jun. 30, 2014 in the State Intellectual Property Office of China, the whole disclosure of which is incorporated herein by reference.

TECHNICAL FIELD

Embodiments of the present disclosure relate to the field of image information technology, and more particularly, to a video information play system and method.

BACKGROUND

In conventional players, only transmission of video stream data occurs among various modules in a play system. These various modules are independent of each other, and there is no information interaction therebetween. Therefore, it is likely that all resources are allocated to a play module which most frequently makes a request, which results in a pause in operations of other play modules.

With the rapid development of video players, the requirements for a resolution, a code rate, and a coding manner of a video increase rapidly. However, as various modules in a play system of a conventional video player are independent of each other, an operating mode of the conventional play system is unable to satisfy users' requirements for the resolution and the code rate of video information. When the resolution, the code rate, the coding manner or the like of the video change, the player may not be used to play the video information smoothly, and thereby there is a problem that a pause in play of the video information may occur.

SUMMARY

The embodiments of the present disclosure provide a video information play system and method to solve the above technical problem, thereby optimizing a configuration of a player to achieve smooth play of the video information.

According to a first aspect, a video information play system is provided, comprising:

a video file separator configured to receive audio-visual information from a video source, separate the received audio-visual information to obtain at least video information, audio information, and video information parameters, transmit the obtained video information and audio information to an information processing unit, and transmit the video information parameters to a decoding parameter setting unit and an adaptation unit;

the information processing unit configured to process the video information and output the processed video information;

a system resource monitoring module configured to obtain hardware parameters and resource consumption of the video information play system;

the decoding parameter setting unit configured to set decoding parameters corresponding to the video information to be played according to the video information parameters; and the adaptation unit configured to obtain video information play parameters of the video information to be played according to the video information parameters, configure parameters of the information processing unit according to the obtained hardware parameters and resource consumption of the video information play system, the decoding parameters and the video information play parameters, and configure parameters of the video file separator according to the video information play parameters.

In a possible implementation, the adaptation unit comprises:

a system residual resource calculation unit configured to calculate an amount of residual resources of the video information play system according to the resource consumption of the video information play system;

a resource usage calculation unit configured to calculate a resource usage condition of the video information play system after the video information to be played is normally played according to the amount of residual resources of the video information play system and a decoding computational complexity; and a resource balance configuration unit configured to configure the parameters of the information processing unit according to the resource usage condition of the video information play system, a total amount of resources of the video information play system, the video information play parameters of the video information to be played, and the hardware parameters of the video information play system, and configure the parameters of the video file separator according to the video information play parameters of the video information to be played.

In a possible implementation, the adaptation unit further comprises:

a video play parameter setting unit;
a first decoding complexity calculation unit;
a second decoding complexity calculation unit;

wherein, the resource balance configuration unit is configured to compare the video information play parameters with the hardware parameters of the video information play system, compare the resource usage condition of the video information play system with the total amount of resources of the video information play system, and provide a comparison result to the video play parameter setting unit;

the video play parameter setting unit is configured to set the video information play parameters according to the video information parameters and the hardware parameters of the video information play system, and the hardware parameters of the video play system, and update the video information play parameters according to a comparison result and the hardware parameters of the video information play system;

the first decoding complexity calculation unit is configured to calculate a corresponding decoding computational complexity as a first decoding computational complexity according to the video information play parameters;

the second decoding complexity calculation unit is configured to calculate a corresponding decoding computational complexity as a second decoding computational complexity according to the decoding parameters;

the resource usage calculation unit is configured to calculate the resource usage condition of the video information play system after the video information to be played is normally played according to the amount of residual resources of the video information play system, the first decoding computational complexity and the second decoding computational complexity; and the resource balance configuration unit is further configured to configure the parameters of the information processing unit according to a comparison result between the resource usage condition and the total amount of resources of the video information play system, and the video information play parameters.

In a possible implementation, the information processing unit comprises:

a video decoding unit configured to decode the video information;

a video processing unit configured to implement image processing on the decoded video information; and a video output module configured to output the processed video information.

Preferably, the information processing unit further comprises:

an audio decoding unit configured to decode the audio information;

an audio processing unit configured to process the decoded audio information; and an audio output module configured to output the processed audio information.

According to a second aspect, a video information play method is provided, comprising:

obtaining video information parameters of video information to be played as initial video information play parameters, and calculating a corresponding decoding computational complexity as a first decoding computational complexity according to the initial video information play parameters;

determining initial decoding parameters corresponding to the initial video information play parameters, and calculating a corresponding decoding computational complexity as a second decoding computational complexity according to the initial decoding parameters;

obtaining hardware parameters and resource consumption of the video information play system; and configuring parameters of the information processing unit and the video file separator in the video information play system respectively according to the first decoding computational complexity, the second decoding computational complexity, and the hardware parameters and resource consumption of the video information play system.

In a possible implementation, configuring parameters of the information processing unit and the video file separator in the video information play system respectively comprises:

calculating an amount of residual resources of the video information play system according to the resource consumption of the video information play system;

calculating a resource usage of the video information play system after the video information to be played is played according to the amount of residual resources of the video information play system, the first decoding computational complexity, and the second computational complexity; and configuring parameters of the information processing unit and the video file separator respectively according to the resource usage, the hardware parameters of the video information play system and the video information play parameters.

Preferably, configuring parameters of the information processing unit and the video file separator respectively according to the resource usage, the hardware parameters of the video information play system and the video information play parameters comprises:

judging whether the initial video information play parameters exceed a range of the hardware parameters of the video information play system; and if the initial video information play parameters exceed the range of the hardware parameters of the video information play system, updating the initial video information play parameters until the video information play parameters do not exceed the range of the hardware parameters of the video information play system, to obtain the updated video information play parameters, and configuring the parameters of the video file separator according to the updated video information play parameters;

calculating a decoding computational complexity corresponding to the updated video information play parameters as an updated first decoding computational complexity;

obtaining an updated resource usage of the video information play system according to the amount of residual resources of the video information play system, the updated first decoding computational complexity, and the second decoding computational complexity;

if the updated resource usage exceeds a total amount of resources of the video information play system, reducing the initial decoding parameters until the corresponding resource usage does not exceed the total amount of resources of the video information play system, and configuring the parameters of the information processing unit according to the corresponding resource usage, the hardware parameters of the video information play system, and the updated video information play parameters; and if the updated resource usage does not exceed the total amount of resources of the video information play system, configuring the parameters of the information processing unit according to the updated resource usage, the hardware parameters of the video information play system, and the updated video information play parameters.

In a possible implementation, configuring parameters of the information processing unit and the video file separator respectively according to the resource usage, the hardware parameters of the video information play system and the video information play parameters comprises:

judging whether the initial video information play parameters exceed a range of the hardware parameters of the video information play system; and if the initial video information play parameters do not exceed the range of the hardware parameters of the video information play system, configuring the parameters of the video file separator according to the initial video information play parameters;

if the resource usage does not exceed the total amount of resources of the video information play system, configuring the parameters of the information processing unit according to the resource usage, the hardware parameters of the video information play system, and the initial video information play parameters;

if the resource usage exceeds the total amount of resources of the video information play system, reducing the initial decoding parameters, until the corresponding resource usage does not exceed the total amount of resources of the video information play system, and configuring the parameters of the information processing unit according to the corresponding resource usage, the hardware parameters of the video information play system, and the initial video information play parameters.

BRIEF DESCRIPTION OF THE DRAWINGS

In order to illustrate technical solutions in the embodiments of the present disclosure or the related art more clearly, accompanying drawings needed to be used in the description of the embodiments or the related art will be described below in brief. Obviously, the accompanying drawings described below are merely some examples of the present disclosure. Those skilled persons in the art can further obtain other drawings according to the accompanying drawing obviously.

DETAILED DESCRIPTION OF THE EMBODIMENTS

The technical solutions in the embodiments of the present disclosure will be clearly and completely described below with reference to the drawings of the embodiments of the present disclosure. Obviously, the embodiments as described are merely a part of embodiments of the present disclosure instead of all the embodiments. All other embodiments obtained by the skilled persons in the art without contributing any creative labor should belong to the scope protected by the present disclosure.

Figure 1:
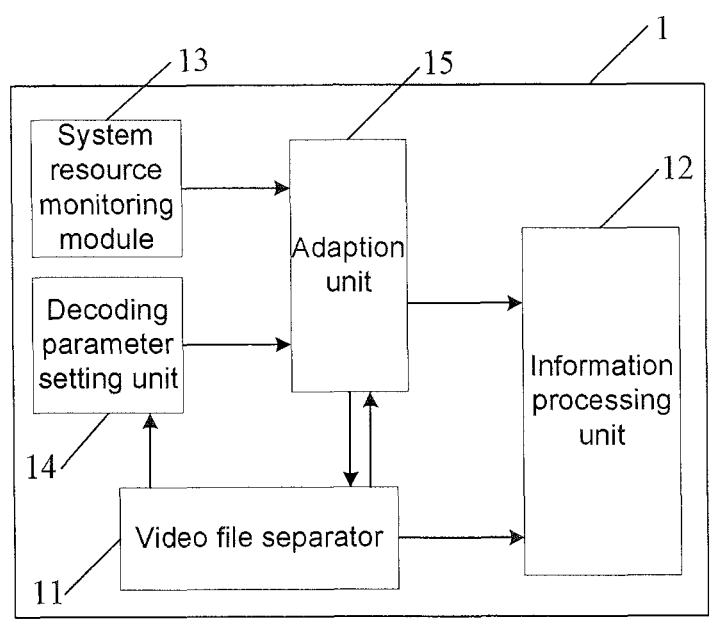
FIG. 1 is a structural diagram of a video information play system according to an embodiment of the present disclosure.

The embodiments of the present disclosure provide a video information play system 1. As shown in FIG. 1, the system may comprise a video file separator 11, an information processing unit 12, a system resource monitoring module 13, a decoding parameter setting unit 14, and an adaptation unit 15.

Next, operations of various modules in the video information play system 1 according to the present embodiment will be described in detail with reference to FIG. 1.

The video file separator 11 is configured to receive audio-visual information from a video source (not shown), separate the received audio-visual information to obtain at least video information, audio information and video information parameters, transmit the video information and the audio information to the information processing unit, and transmit the video information parameters to the decoding parameter setting unit 14 and the adaptation unit 15.

The system resource monitoring module 13 is configured to obtain hardware parameters and resource consumption of the video information play system. For example, the system resource monitoring module 13 may directly read information from a resource manager (not shown) of the video information play system, to obtain the hardware parameters and resource consumption parameters of the video information play system, and transmit the obtained hardware parameters and resource consumption parameters to the adaptation unit 15 connected thereto. Examples of the hardware parameters of the video information play system may comprise information such as hardware parameters of a display, a display resolution, a display refresh rate or the like. The resource consumption parameters of the video information play system may comprise information such as a memory occupancy rate, a CPU occupancy rate or the like. Obviously, the present disclosure is not limited thereto.

The decoding parameter setting unit 14 is configured to obtain play parameters of the video information to be played according to the video information parameters from the video file separator 11, calculate initial decoding parameters corresponding to the video information to be played, and transmit the obtained play parameters of the video information to be played and the calculated initial decoding parameters to the adaptation unit 15 connected thereto. For example, the parameters of the video information may comprise information such as a video resolution, a video refresh rate, a coding manner corresponding to the video information, or the like. A method for calculating decoding parameters corresponding to the video information to be played may be known with reference to the conventional method for calculating decoding parameters in the process of play of video information.

The adaptation unit 15 is configured to configure parameters of the information processing unit 12 according to the hardware parameters and resource consumption from the system resource monitoring module 13 and play parameters of the video information to be played and the decoding parameters from the decoding parameter setting unit 14, and configure parameters of the video file separator 11 according to the video information play parameters of the video information to be played.

In a preferable embodiment, the adaptation unit 15 is configured to compare the hardware parameters of the video information play system with the play parameters of the video information to be played, calculate an amount of residual resources of the video information play system after the video information to be played is played according to the resource consumption of the video information play system, compare the amount of residual resources of the video information play system with a total amount of resources of the video information play system, and then configure the parameters of the information processing unit according to a comparison result. Further, the adaptation unit 15 is configured to configure the parameters of the video file separator 11 according to the video information play parameters of the video information to be played, so that the video file separator may separate the received audio-visual information into at least video information, audio information and video information parameters and transmit the video information, audio information and video information parameters to downstream units or modules.

A system resource monitoring module, a decoding parameter setting unit, and an adaptation unit are arranged in the video information play system according to the embodiments of the present disclosure. The adaptation unit obtains current video information play parameters according to the video information parameters obtained by the video separator, and analyzes the current video information play parameters, the hardware parameters and resource consumption of the video information play system which are obtained by the system resource monitoring module and the decoding parameters of the video information to be played which is obtained by the decoding parameter setting unit to reasonably configure parameters of for example a video decoding unit, a video processing unit, a video output module, an audio decoding unit, an audio processing unit, and an audio output module in the information processing unit 12, and reasonably configure the parameters of the video separator 11 according to the current video information play parameters. This optimizes a configuration of a player, and achieves smooth play of the video information.

Figure 2:
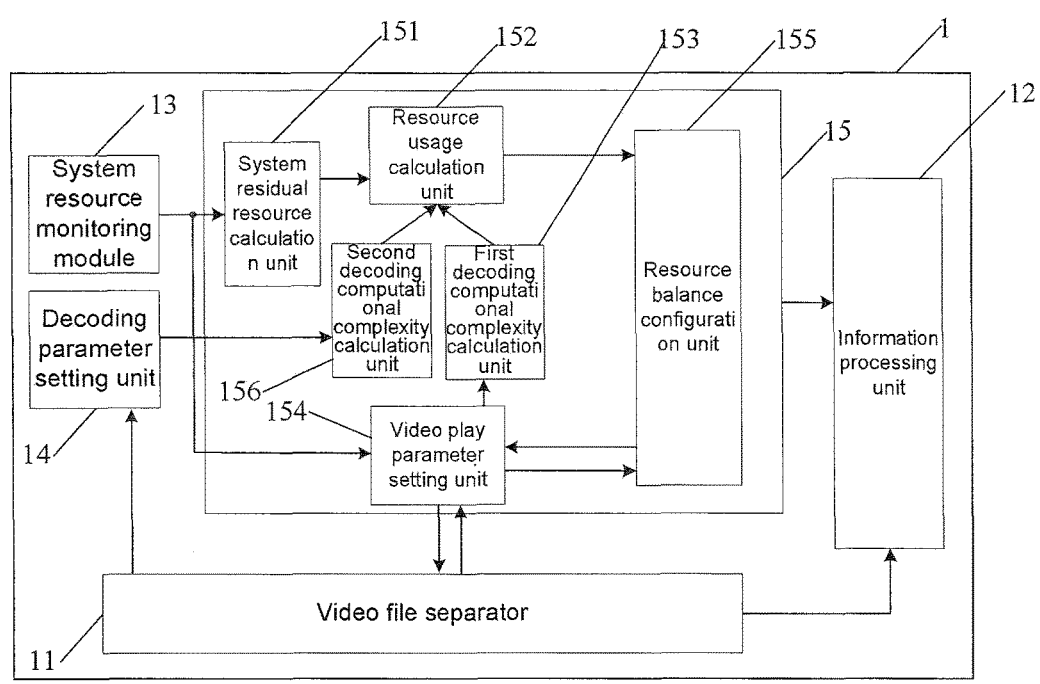
FIG. 2 is a structural diagram of another video information play system according to an embodiment of the present disclosure.

Further, as shown in FIG. 2, the adaptation unit 15 in the video information play system 1 according to the present embodiment may include a system residual resource calculation unit 151, a resource usage calculation unit 152, a first decoding computational complexity calculation unit 153, a second decoding computational complexity calculation unit 156, a video play parameter setting unit 154 and a resource balance configuration unit 155. Next, operations of various units in the adaptation unit 15 according to the present embodiment will be described in detail.

The system residual resource calculation unit 151 is configured to obtain an amount of residual resources of the video information play system by calculating the amount of residual resources of the video information play system according to the resource consumption of the video information play system from the system resource monitoring module 13, and transmit the obtained amount of residual resources to the resource usage calculation unit 152. Specifically, the system residual resource calculation unit 151 may obtain the amount of residual resources of the video information play system by subtracting the resource consumption of the video information play system from the total amount of resources of the video information play system.

The first decoding computational complexity calculation unit 153 is configured to obtain a first decoding computational complexity of the video information to be played according to the current video information play parameters of the video information to be played from the video play parameter setting unit 154, and transmit the first decoding computational complexity to the resource usage calculation unit 152. Specifically, a method for calculating a decoding computational complexity of the video information to be played can be known with reference to any one of the existing feasible technical solutions, which will not be described here. An approach of obtaining the updated video information play parameters of the video information to be played will be described below in detail.

The resource usage calculation unit 152 is configured to calculate a resource usage condition of the video information play system after the video information to be played is normally played according to the amount of residual resources of the video information play system from the system residual resource calculation unit 151 and the decoding parameters from the decoding parameter setting unit 14. The resources of the video information play system which are occupied when the video information to be played is played may be obtained according to an optimal configuration of related parameters of the information processing unit.

The resource balance configuration unit 155 is configured to configure the parameters of the information processing unit 12 and the parameters of the video file separator 11 respectively according to the resource usage condition of the video information play system from the resource usage calculation unit 152, the total amount of resources of the video information play system, the video information play parameters of the video information to be played, and the hardware parameters of the video information play system. Specifically, the resource balance configuration unit 155 is configured to compare the video information play parameters of the video information to be played with the hardware parameters of the video information play system, compare the resource usage condition of the video information play system with the total amount of resources of the video information play system, and feed a comparison result back to the video play parameter setting unit 154.

The video play parameter setting unit 154 is configured to update the parameters of the video information to be played according to the comparison result between the parameters of the video information to be played and the hardware parameters of the video information play system, and the hardware parameters of the video information play system.

As shown in FIG. 2, the adaptation unit 15 may further comprise a second computational complexity calculation unit 156. The second computational complexity calculation unit 156 is configured to calculate a second decoding computational complexity according to the decoding parameters from the decoding parameter setting unit 154.

The resource usage calculation unit 152 is configured to calculate the resource usage condition of the video information play system after the video information to be played is normally played according to the amount of residual resources of the video information play system, the first decoding computational complexity and the second decoding computational complexity.

The resource balance configuration unit 155 is configured to configure the parameters of the information processing unit 15 according to a relationship between the resource usage condition of the video information play system and the total resources of the video information play system and the current video information play parameters of the video information to be played. Specifically, the resource balance configuration unit 155 firstly compares the obtained video information play parameters of the video information to be played with the hardware parameters of the video information play system, to judge whether various video information play parameters exceed the setting of the corresponding hardware parameters of the video information play system. If at least one of the video information play parameters exceeds a corresponding hardware parameter of the video information play system, a maximum value of the corresponding hardware parameter is transmitted to the video play parameter setting unit 154. The video play parameter setting unit 154 resets the corresponding video information play parameter to the maximum value of the video information play system, and then transmits the reset corresponding video information play parameter to the first decoding computational complexity calculation unit 153 as a current video information play parameter.

The first decoding computational complexity calculation unit 153 obtains the updated first decoding computational complexity of the video information to be played according to the updated current video information play parameters from the video play parameter setting unit 154, and transmits the updated first decoding computational complexity to the resource usage calculation unit 152. The resource usage calculation unit 152 recalculates the resource usage, condition of the video information play system after the video information is played as the updated resource usage of the video information play system according to the second decoding computational complexity and the updated first decoding computational complexity, and transmits the resource usage condition to the resource balance configuration unit 155 as an updated resource usage of the video information play system. In this case, the resource balance configuration unit 155 judges whether the updated resource usage of the video information play system exceeds the total amount of resources of the video information play system. If the updated resource usage does not exceed the total amount of resources of the video information play system, parameters of various modules in the information processing unit are configured according to a normal decoding complexity of the video information. If the resource usage exceeds the total amount of resources of the video information play system, the parameters of the various modules in the information processing unit are configured according to a reduced decoding complexity of the video information. For example, the decoding complexity may be reduced until the resource usage of the video information play system does not exceed the total amount of resources of the video information play system. In addition, the parameters of the video file separator are configured according to the current play parameters of the video information to be played, so that the video file separator separates the audio-visual information to be played into at least video information, audio information, and video information parameters.

If the video information play parameters do not exceed the allowable maximum parameters of the video information play system, the resource balance configuration unit 155 further judges whether the resource usage of the video information play system exceeds the total amount of resources of the video information play system. If the resource usage does not exceed the total amount of resources of the video information play system, parameters of various modules in the information processing unit are configured according to a normal decoding complexity of the video information. If the resource usage of the video information play system exceeds the total amount of resources of the video information play system, the parameters of the various modules in the information processing unit are configured according to a reduced decoding complexity of the video information and the video information play parameters of the video information to be played. In addition, the parameters of the video file separator are configured according to the video information play parameters of the video information to be played.

Figure 3:
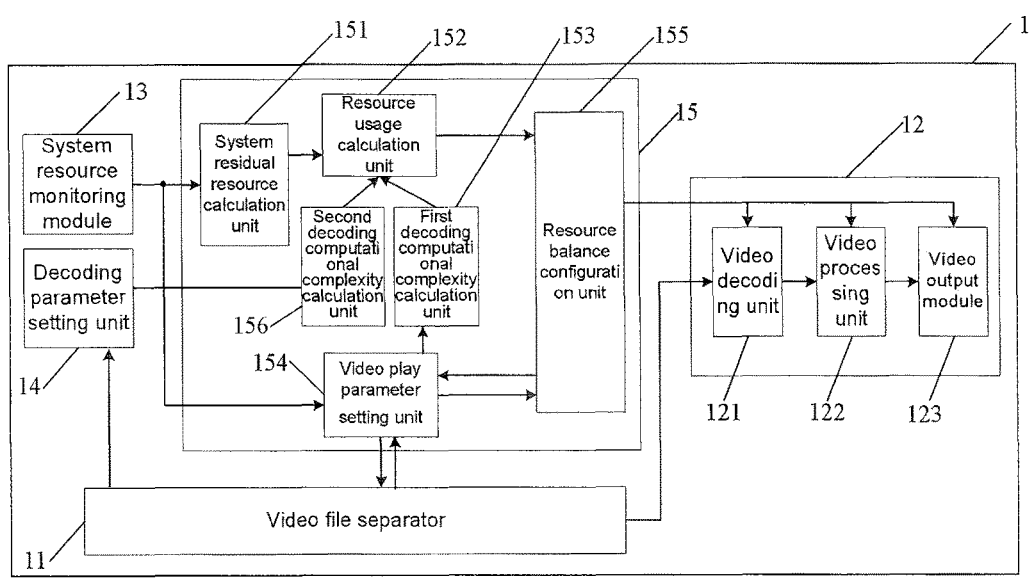
FIG. 3 is a structural diagram of another video information play system according to an embodiment of the present disclosure.

As shown in FIG. 3, the information processing unit 12 in the video information play system may further comprise a video decoding unit 121, a video processing unit 122, and a video output module 123. Next, operations of various units in the information processing unit 12 according to the present embodiment will be described in detail.

The video decoding unit 121 is configured to decode the video information to be played from the video file separator 11.

The video processing unit 122 is configured to implement image processing on the decoded video information from the video decoding unit 121, and transmit the processed video stream to the video output module 123 for output.

For example, the image processing implemented by the video processing unit 122 may comprise color adjustment, edge enhancement, contrast enhancement or the like.

As shown in FIG. 3, the video decoding unit 121, the video processing unit 122 and the video output module 123 are connected to the resource balance configuration unit 155 in the adaptation unit 15, so as to receive the corresponding configuration parameters from the resource balance configuration unit 155.

Preferably, the parameters of the video decoding unit may comprise information such as a decoding filter complexity, an intra-frame prediction complexity, an inverse transformation complexity, a Model Counter (MC for short) variable complexity or the like. The parameters of the video processing unit may comprise a video sharpening configuration, a noise reduction configuration or the like.

The parameters of the video output module may comprise an interpolation method, a color space transformation configuration, a de-interlacing method or the like.

Figure 4:
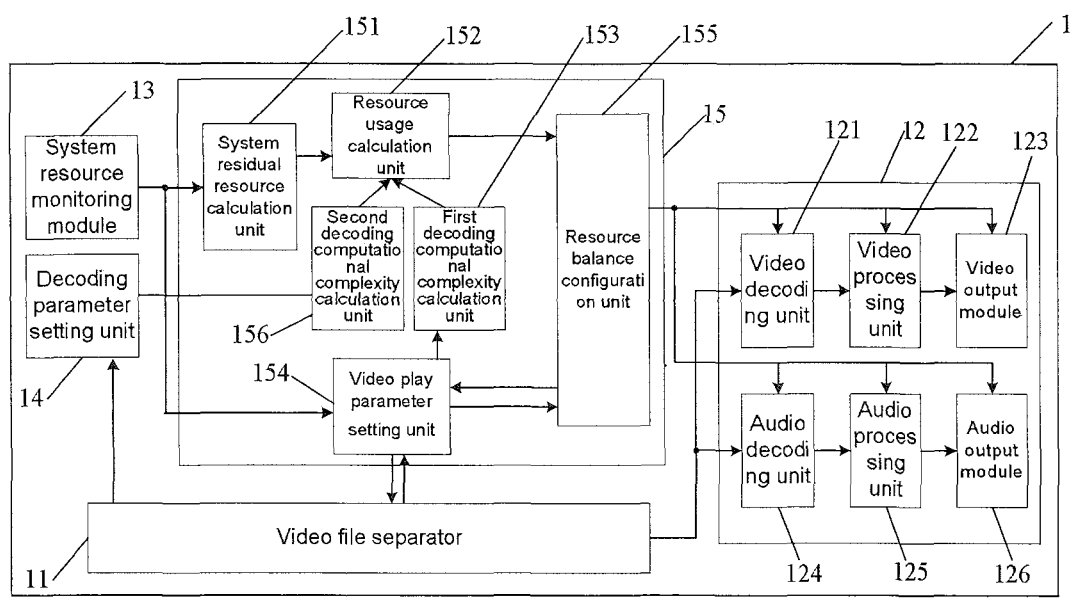
FIG. 4 is a structural diagram of another video information play system according to an embodiment of the present disclosure.

As shown in FIG. 4, the information processing unit 12 may further comprise an audio decoding unit 124, an audio processing unit 125 and an audio output module 126.

The audio decoding unit 124 is configured to decode the audio information to be played from the video file separator 11.

The audio processing unit 125 is configured to process the decoded audio information from the audio decoding unit 124 and transmit the processed audio stream to the audio output module 126.

Specifically, the audio processing unit 125 adjusts parameters such as a frequency, a sound, an audio effect or the like of the decoded audio information and then transmits the audio information to the audio output module 126.

The audio output module 126 is configured to convert the audio information from the audio processing unit 125 into an analog signal and output the analog signal.

Specifically, the audio output module 126 may convert the obtained digital audio information into an analog signal and output the analog signal to a sound card.

As shown in FIG. 4, the audio decoding unit 121, the audio processing unit 122 and the audio output module 123 may be connected to the resource balance configuration unit 155 in the adaptation unit 15, so as to receive corresponding configuration parameters from the resource balance configuration unit 155.

For example, the parameters of the audio decoding unit may comprise information such as a dynamic range control level or the like.

The parameters of the audio processing unit may comprise information such as a hybrid coding level of the audio information, a Dolby format of the audio information or the like.

The parameters of the audio output module may comprise an audio output format, a bit occupied by an audio output or the like. As the processing of the audio information generally occupies a few system resources, the processing according to the embodiments of the present disclosure may not be applied to the audio information.

A system resource monitoring module, a decoding parameter setting unit, and an adaptation unit are arranged in the video information play system according to the embodiment of the present disclosure. The adaptation unit obtains the video information play parameters of the video information to be played according to the video information parameters from the video file separator, analyzes the video information play parameters, the hardware parameters and resource consumption of the video information play system which are obtained by the system resource monitoring module and the decoding parameters of the video information to be played which is obtained by the decoding parameter setting unit to reasonably configure parameters used by various modules in the information processing unit, and at the same time configure the parameters of the video file separator according to the video information play parameters of the video information to be played. This optimizes a configuration of a player, and achieves smooth play of the video information.

Figure 5:
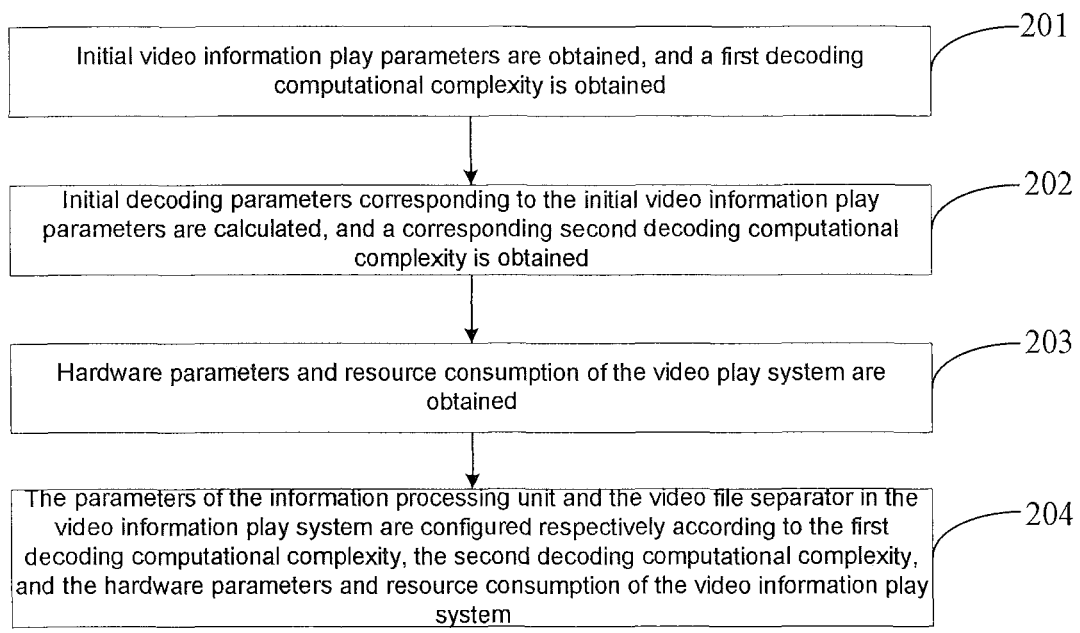
FIG. 5 is a flowchart of a video information play method according to an embodiment of the present disclosure.

The embodiments of the present disclosure provide a video information play method. As shown in FIG. 5, the method may comprise the following steps.

In 201, video information parameters of video information to be played are obtained as initial video information play parameters, and a corresponding decoding computational complexity is calculated as a first decoding computational complexity according to the initial video information play parameters.

In 202, initial decoding parameters corresponding to the initial video information play parameters are determined, and a corresponding decoding computational complexity is calculated as a second decoding computational complexity according to the initial decoding parameters.

In 203, hardware parameters and resource consumption of the video information play system are obtained.

In 204, the parameters of the information processing unit and the parameters of the video file separator are configured respectively according to the first decoding computational complexity, the second decoding computational complexity, and the hardware parameters and resource consumption of the video information play system.

With the video information play method according to the embodiments of the present disclosure, the first decoding computational complexity, the second decoding computational complexity, and the hardware parameters and resource consumption of the video information play system are analyzed, so as to reasonably configure the parameters of for example the information processing unit in the video information play system, and at the same time configure the parameters of the video file separator according to the parameters of the video information to be played. This optimizes a configuration of a player, and achieves smooth play of the video information.

Figure 6:
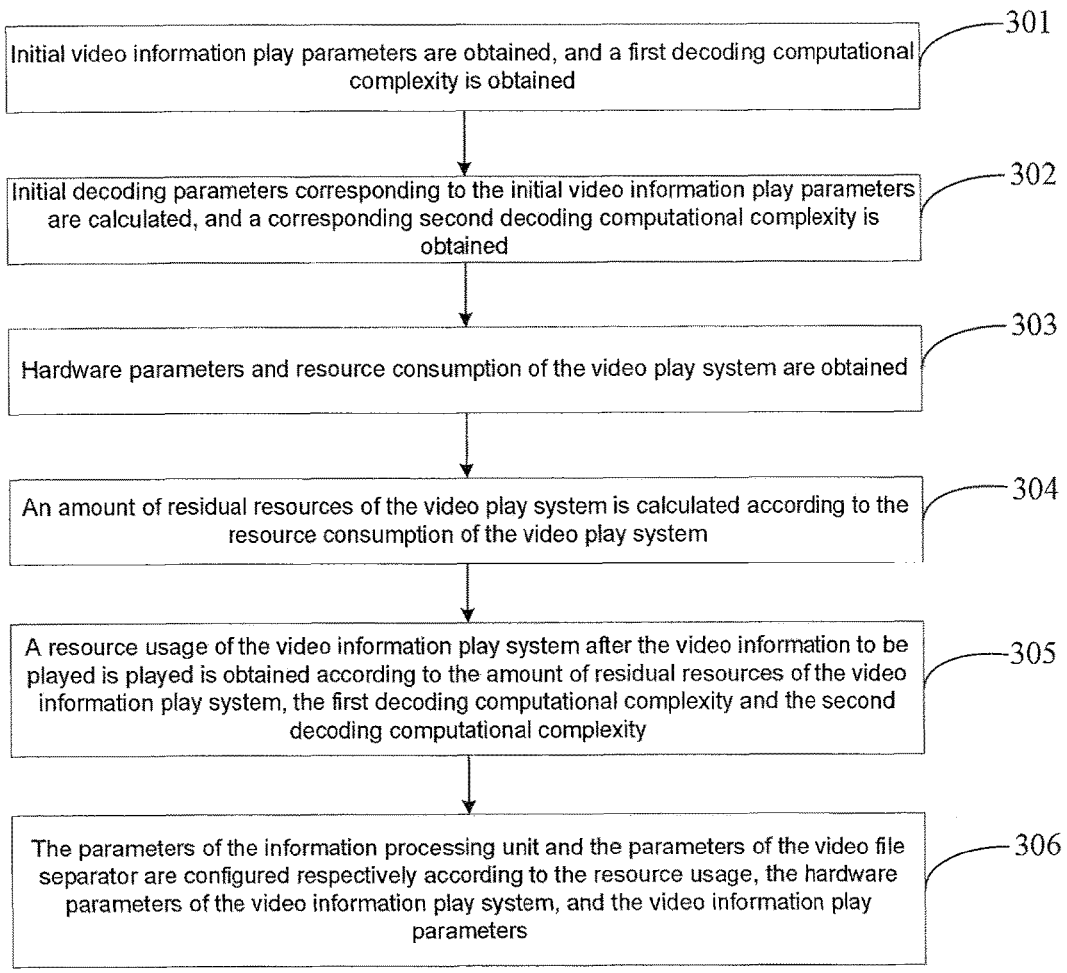
FIG. 6 is a flowchart of another video information play method according to an embodiment of the present disclosure.

Another embodiment of the present disclosure provides another video information play method. As shown in FIG. 6, the method may comprise the following steps.

In 301, video information parameters of video information to be played are obtained as initial video information play parameters, and a corresponding decoding computational complexity is calculated as a first decoding computational complexity according to the initial video information play parameters.

In 302, initial decoding parameters corresponding to the initial video information play parameters are determined, and a corresponding decoding computational complexity is calculated as a second decoding computational complexity according to the initial decoding parameters.

In 303, hardware parameters and resource consumption of the video information play system are obtained.

In 304, an amount of residual resources of the video information play system is calculated according to the resource consumption of the video information play system.

In 305, a resource usage of the video information play system after the video information to be played is played is obtained according to the amount of residual resources of the video information play system, the first decoding computational complexity and the second decoding computational complexity.

In 306, the parameters of the information processing unit and the parameters of the video file separator are configured respectively according to the resource usage, the hardware parameters of the video information play system, and the video information play parameters of the video information to be played.

It should be noted that various steps in the present embodiment may be implemented by various corresponding modules in the video information play system according to the present disclosure, which may be known with reference to related description of the video information play system according to the present disclosure, and will not be described here.

With the video information play method according to the embodiments of the present disclosure, the obtained hardware parameters and resource consumption of the video information play system, the first decoding computational complexity and the second decoding computational complexity are analyzed, so as to reasonably configure the video information play parameters of the information processing unit, and at the same time further configure the parameters of the video file separator according to the parameters of the video information to be played. This optimizes a configuration of a player, and achieves smooth play of the video information.

Figure 7:
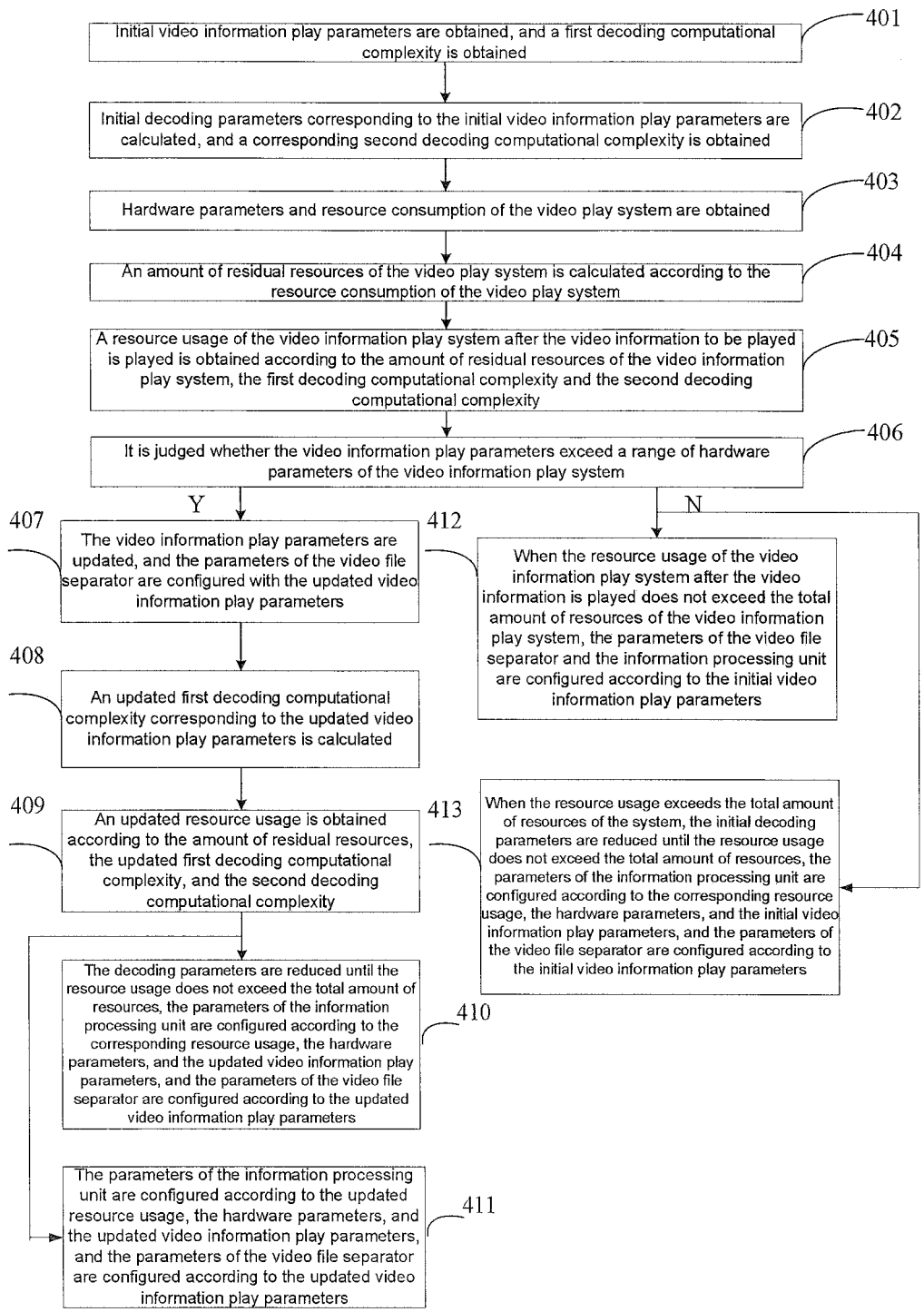
FIG. 7 is a flowchart of another video information play method according to an embodiment of the present disclosure.

The embodiments of the present disclosure provide a video information play method. As shown in FIG. 7, the method may comprise the following steps.

In 401, video information parameters of video information to be played are obtained as initial video information play parameters, and a corresponding decoding computational complexity is calculated as a first decoding computational complexity according to the initial video information play parameters.

In 402, initial decoding parameters corresponding to the initial video information play parameters are determined, and a corresponding decoding computational complexity is calculated as a second decoding computational complexity according to the initial decoding parameters.

In 403, hardware parameters and resource consumption of the video information play system are obtained.

In 404, an amount of residual resources of the video information play system is calculated according to the resource consumption of the video information play system.

In 405, a resource usage of the video information play system after the video information to be played is played is obtained according to the amount of residual resources of the video information play system, the first decoding computational complexity and the second decoding computational complexity.

In 406, it is judged whether the initial video information play parameters exceed a range of hardware parameters of the video information play system.

In 407, if the initial video information play parameters exceed the range of the hardware parameters of the video information play system, the video information play parameters are updated until the video information play parameters do not exceed the hardware parameters of the video information play system, to obtain the updated video information play parameters, and the parameters of the video file separator are configured according to the updated video information play parameters.

In 408, an updated decoding computational complexity corresponding to the updated video information play parameters is calculated as an updated first decoding computational complexity.

In 409, an updated resource usage is obtained according to the amount of residual resources of the video information play system, the second decoding computational complexity, and the updated first decoding computational complexity.

If the updated resource usage exceeds the total amount of resources of the video information play system, step 410 is performed; and if the updated resource usage does not exceed the total amount of resources of the video information play system, step 411 is performed.

In step 410, the initial decoding parameters of the video to be played are reduced until the corresponding resource usage of the video information play system does not exceed the total amount of resources of the video information play system, the parameters of the information processing unit are configured according to the corresponding resource usage, the hardware parameters of the video information play system, and the updated play parameters of the video information to be played, and at the same time, the parameters of the video file separator are configured according to the updated video information play parameters.

In step 411, the parameters of the information processing unit are configured according to the updated resource usage, the hardware parameters of the video information play system, and the updated play parameters of the video information to be played, and at the same time, the parameters of the video file separator are configured according to the updated video information play parameters.

Specifically, if the updated resource usage exceeds the total amount of resources of the video information play system, the decoding parameters (for example, a decoding complexity) of the video information are reduced, and the decoding computational complexity of the video information to be played is recalculated according to the reduced decoding complexity, so as to recalculate the resource usage condition of the video information play system after the video information to be played is played as the further updated resource usage (i.e., a corresponding resource usage). Then, it is judged whether the corresponding resource usage exceeds the total amount of resources of the video information play system. If the corresponding resource usage exceeds the total amount of resources of the video information play system, the decoding complexity of the video information to be played is further reduced, until the corresponding resource usage does not exceed the total amount of resources of the video information play system. Then, the parameters of various modules in the information processing unit are configured according to the corresponding resource usage, the hardware parameters of the video information play system, and the updated play parameters of the video information to be played.

If the updated resource usage does not exceed the total amount of resources of the video information play system, the parameters of various modules in the information processing unit are configured according to the updated resource usage, the hardware parameters of the video information play system, and the updated video information play parameters. At the same time, the parameters of the video file separator are configured according to the updated video information play parameters.

Further, if the initial video information play parameters do not exceed the range of the hardware parameters of the video information play system, step 412 or step 413 may be performed. If the resource usage of the video information play system after the video information to be played is played does not exceed the total amount of resources of the video information play system, step 412 is performed. If the resource usage of the video information play system after the video information to be played is played exceeds the total amount of resources of the video information play system, step 413 is performed.

In step 412, the parameters of the information processing unit and the video file separator are configured according to the initial video information play parameters.

In step 413, the initial decoding parameters (for example, a decoding complexity) of the video information to be played are reduced until the corresponding resource usage does not exceed the total amount of resources of the video information play system, and the parameters of the information processing unit are configured according to the corresponding resource usage, the hardware parameters of the video information play system, and the initial video information play parameters. At the same time, the parameters of the video file separator are configured according to the initial video information play parameters.

Specifically, if the configuration of the initial video information play parameters does not exceed the range of the hardware parameters of the video information play system, the parameters of the video file separator are configured according to the initial video information play parameters. If the resource usage of the video information play system after the video information to be played is played exceeds the total amount of resources of the video information play system, the decoding complexity of the video information to be played is reduced until the corresponding resource usage of the video information play system does not exceed the total amount of resources of the video information play system, and then the parameters of various modules in the information processing unit are configured according to the corresponding resource usage, the hardware parameters of the video information play system, and the initial video information play parameters. If the resource usage of the video information play system after the video information to be played is played does not exceed the total amount of resources of the video information play system, the parameters of the various modules in the information processing unit are directly configured according to initial video information play parameters of the video information.

It should be noted that various steps in the present embodiment may be implemented by various corresponding modules in the video information play system according to the present disclosure, which may be known with reference to related description of the video information play system according to the present disclosure, and will not be described here.

A person having ordinary skill in the art can understand that all or a part of steps for implementing the above method embodiments may be implemented by programs instructing related hardware. The programs above may be stored in a computer readable storage medium. When the programs are executed, the steps of the above method embodiments are implemented. The storage medium above may be a medium which can store program codes, such as a Read-Only Memory (ROM), a Random Access Memory (RAM), a disk, or a disc etc.

The above description is merely specific embodiments of the present disclosure. However, the protection scope of the present disclosure is not limited thereto. Variations or substitutions which are easily reached by any skilled in the art within the technical scope of the present disclosure should be contained in the protection scope of the present disclosure. Therefore, the protection scope of the present disclosure should be defined by the protection scope of the claims.

What is claimed is:

1. A video information play system, comprising:
a video file separator configured to receive audio-visual information from a video source, separate the received audio-visual information to obtain at least video information, audio information, and video information parameters, transmit the obtained video information and audio information to an information processing unit, and transmit the video information parameters to a decoding parameter setting unit and an adaptation unit;
the information processing unit configured to process the video information and output the processed video information;
a system resource monitoring module configured to obtain hardware parameters and resource consumption of the video information play system;

the decoding parameter setting unit configured to set decoding parameters corresponding to the video information to be played according to the video information parameters; and an adaptation unit configured to obtain video information play parameters of the video information to be played according to the video information parameters, configure parameters of the information processing unit according to the obtained hardware parameters and resource consumption of the video information play system, the decoding parameters, and the video information play parameters, and configure parameters of the video file separator according to video information play parameters;

wherein the adaptation unit comprises:

a system residual resource calculation unit configured to calculate an amount of residual resources of the video information play system according to the resource consumption of the video information play system;

a resource usage calculation unit configured to calculate a resource usage condition of the video information play system after the video information to be played is normally played according to the amount of residual resources of the video information play system and a decoding computational complexity; and a resource balance configuration unit configured to configure the parameters of the information processing unit according to the resource usage condition of the video information play system, a total amount of resources of the video information play system, the video information play parameters of the video information to be played, and the hardware parameters of the video information play system, and configure the parameters of the video file separator according to the video information play parameters of the video information to be played.

2. The system according to claim 1, wherein the adaptation unit further comprises:

a video play parameter setting unit;

a first decoding complexity calculation unit;

a second decoding complexity calculation unit;

wherein, the resource balance configuration unit is configured to compare the video information play parameters with the hardware parameters of the video information play system, compare the resource usage condition of the video information play system with the total amount of resources of the video information play system, and provide a comparison result to the video play parameter setting unit;

the video play parameter setting unit is configured to set the video information play parameters according to the video information parameters and the hardware parameters of the video information play system, and update the video information play parameters according to the comparison result and the hardware parameters of the video information play system;

the first decoding complexity calculation unit is configured to calculate a corresponding decoding computational complexity as a first decoding computational complexity according to the video information play parameters;

the second decoding complexity calculation unit is configured to calculate a corresponding decoding computational complexity as a second decoding computational complexity according to the decoding parameters;

the resource usage calculation unit is configured to calculate the resource usage condition of the video information play system after the video information to be played is normally played according to the amount of residual resources of the video information play system, the first decoding computational complexity, and the second decoding computational complexity; and the resource balance configuration unit is further configured to configure the parameters of the information processing unit according to the comparison result between the resource usage condition and the total amount of resources of the video information play system, and the video information play parameters.

3. The system according to claim 2, wherein the information processing unit comprises:

a video decoding unit configured to decode the video information;

a video processing unit configured to implement image processing on the decoded video information; and a video output module configured to output the processed video information.

4. The system according to claim 3, wherein the information processing unit further comprises:

an audio decoding unit configured to decode the audio information;

an audio processing unit configured to process the decoded audio information; and an audio output module configured to output the processed audio information.

5. The system according to claim 1, wherein the information processing unit comprises:

a video decoding unit configured to decode the video information;

a video processing unit configured to implement image processing on the decoded video information; and a video output module configured to output the processed video information.

6. The system according to claim 5 wherein the information processing unit further comprises:

an audio decoding unit configured to decode the audio information;

an audio processing unit configured to process the decoded audio information; and an audio output module configured to output the processed audio information.

7. The system according to claim 1, wherein the information processing unit comprises:

a video decoding unit configured to decode the video information;

a video processing unit configured to implement image processing on the decoded video information; and a video output module configured to output the processed video information.

8. The system according to claim 7, wherein the information processing unit further comprises:

an audio decoding unit configured to decode the audio information;

an audio processing unit configured to process the decoded audio information; and an audio output module configured to output the processed audio information.

9. A video information play method applied in a video information play system, comprising:

obtaining video information parameters of video information to be played as initial video information play parameters, and calculating a corresponding decoding computational complexity as a first decoding computational complexity according to the initial video information play parameters;

determining initial decoding parameters corresponding to the initial video information play parameters, and calculating a corresponding decoding computational complexity as a second decoding computational complexity according to the initial decoding parameters;

obtaining hardware parameters and resource consumption of the video information play system; and configuring parameters of the information processing unit and the video file separator in the video information play system respectively according to the first decoding computational complexity, the second computational complexity, and the hardware parameters and resource consumption of the video information play system;

wherein configuring parameters of the information processing unit and the video file separator in the video information play system respectively comprises:

calculating an amount of residual resources of the video information play system according to the resource consumption of the video information play system;

calculating a resource usage of the video information play system after the video information to be played is played according to the amount of residual resources of the video information play system, the first decoding computational complexity, and the second decoding computational complexity; and configuring parameters of the information processing unit and the video file separator respectively according to the resource usage, the hardware parameters of the video information play system, and the video information play parameters.

10. The method according to claim 9, wherein configuring parameters of the information processing unit and the video file separator respectively according to the resource usage, and the hardware parameters of the video information play system, and the video information play parameters comprises:

judging whether the initial video information play parameters exceed a range of the hardware parameters of the video information play system;

if the initial video information play parameters exceed the range of the hardware parameters of the video information play system, updating the initial video information play parameters until the video information play parameters do not exceed the range of the hardware parameters of the video information play system, to obtain the updated video information play parameters, and configuring the parameters of the video file separator according to the updated video information play parameters;

calculating a decoding computational complexity corresponding to the updated video information play parameters as an updated first decoding computational complexity;

obtaining an updated resource usage of the video information play system according to the amount of residual resources of the video information play system, the updated first decoding computational complexity, and the second decoding computational complexity;

if the updated resource usage exceeds a total amount of resources of the video information play system, reducing the initial decoding parameters until the corresponding resource usage does not exceed the total amount of resources of the video information play system, and configuring the parameters of the information processing unit according to the corresponding resource usage, the hardware parameters of the video information play system, and the updated video information play parameters; and if the updated resource usage does not exceed the total amount of resources of the video information play system, configuring the parameters of the information processing unit according to the updated resource usage, the hardware parameters of the video information play system, and the updated video information play parameters.

11. The method according to claim 9, wherein configuring the parameters of the information processing unit and the video file separator respectively according to the resource usage, the hardware parameters of the video information play system, and the video information play parameters comprises: judging whether the initial video information play parameters exceed a range of the hardware parameters of the video information play system, and if the initial video information play parameters do not exceed the range of the hardware parameters of the video information play system, configuring the parameters of the video file separator according to the initial video information play parameters; if the resource usage does not exceed the total amount of resources of the video information play system, configuring the parameters of the information processing unit according to the resource usage, the hardware parameters of the video information play system, and the initial video information play parameters; and if the resource usage exceeds the total amount of resources of the video information play system, reducing the initial decoding parameters until the corresponding resource usage does not exceed the total amount of resources of the video information play system, and configuring the parameters of the information processing unit according to the corresponding resource usage, the hardware parameters of the video information play system, and the initial video information play parameters.

* * * * *